US009396496B2

(12) United States Patent
Burdett et al.

(10) Patent No.: US 9,396,496 B2
(45) Date of Patent: *Jul. 19, 2016

(54) METHODS, APPARATUS, COMPUTER PROGRAM PRODUCTS AND ARTICLES FOR USE IN PROVIDING HUMAN UNDERSTANDABLE INDICATION OF ACCOUNT BALANCE

(71) Applicant: MasterCard International Incorporated, Purchase, NY (US)

(72) Inventors: Richard Burdett, London (GB); Colin Tanner, Uxbridge (GB); Christopher Leech, Uxbridge (GB)

(73) Assignee: MasterCard International Incorporated, Purchase, NY (US)

( * ) Notice: Subject to any disclaimer, the term of this patent is extended or adjusted under 35 U.S.C. 154(b) by 157 days.

This patent is subject to a terminal disclaimer.

(21) Appl. No.: 14/203,270

(22) Filed: Mar. 10, 2014

(65) Prior Publication Data

US 2014/0191029 A1 Jul. 10, 2014

Related U.S. Application Data

(63) Continuation of application No. 12/356,200, filed on Jan. 20, 2009, now Pat. No. 8,684,261.

(51) Int. Cl.
| | |
|---|---|
| *G06Q 40/00* | (2012.01) |
| *G06Q 40/02* | (2012.01) |
| *G06Q 20/26* | (2012.01) |
| *G06Q 20/32* | (2012.01) |
| *G06Q 20/42* | (2012.01) |
| *G06Q 20/34* | (2012.01) |

(52) U.S. Cl.
CPC ............... *G06Q 40/02* (2013.01); *G06Q 20/26* (2013.01); *G06Q 20/32* (2013.01); *G06Q 20/3223* (2013.01); *G06Q 20/34* (2013.01); *G06Q 20/42* (2013.01)

(58) Field of Classification Search
None
See application file for complete search history.

(56) References Cited

U.S. PATENT DOCUMENTS 8,684,261 B2 * 4/2014 Burdett ............... G06Q 20/26
235/379

* cited by examiner

*Primary Examiner* — Michael G Lee
*Assistant Examiner* — Tabitha Chedekel
(74) *Attorney, Agent, or Firm* — Buckley, Maschoff & Talwalkar LLC

(57) ABSTRACT

In accordance with some embodiments, a method includes receiving, in a proximity coupling system, holder consent to provide a human understandable indication of an account balance associated with a payment account; and providing a human understandable indication of the account balance associated with the payment account via an output device, in response at least in part to the consent; wherein receiving holder consent comprises receiving holder consent provided via a proximity payment device associated with the payment account. In accordance with some embodiments, a method includes storing account data and preference data in a proximity payment device, the preference data indicative of a preferred method to provide a human understandable indication of an account balance. In accordance with some embodiments, apparatus includes a proximity payment device, the proximity payment device including preference data, the preference data indicative of a preferred method to provide a human understandable indication of an account balance. In accordance with some embodiments, apparatus includes a proximity payment device wherein the proximity payment device generates data indicative of whether there is consent to provide a human understandable indication of an account balance based at least in part on whether a holder has actuated a switch.

34 Claims, 11 Drawing Sheets

METHODS, APPARATUS, COMPUTER PROGRAM PRODUCTS AND ARTICLES FOR USE IN PROVIDING HUMAN UNDERSTANDABLE INDICATION OF ACCOUNT BALANCE

CROSS REFERENCE TO RELATED APPLICATION

This is a continuation of co-pending prior U.S. patent application Ser. No. 12/356,200, filed Jan. 20, 2009.

BACKGROUND

Proximity payment devices are in widespread use. A well known standard for proximity payment devices has been promulgated by MasterCard International Incorporated, the assignee hereof, and is referred to as "PayPass". A proximity payment device often includes a wireless communication interface to transmit a payment account number and/or other information to a point of sale (POS) system. The wireless interface often includes a radio frequency identification circuit (RFID IC) and an antenna to communicate with and/or receive a power signal from the POS system.

Some proximity payment devices are associated with a prepaid payment account. However for many card holders tracking the balance of the account represents a challenge. If they get it wrong, it can lead to embarrassment at the checkout, and in some cases the inability to pay for goods or services they may have already had benefit of (e.g. at a restaurant). Moreover, if alcoholic beverages are being served, the card holder's ability to track the balance may be impaired.

To reduce the possibility that a holder of such a proximity payment device (sometimes referred to herein as a proximity payment device holder) will forget the balance and accidentally deplete the account of funds, there is a need to have the capability to provide the holder with information that indicates the balance of the account.

DETAILED DESCRIPTION

Notwithstanding the benefit of providing a card holder with an account balance, it has been determined that it may be undesirable to provide a receipt with the account balance after each transaction. For example, printing a receipt can complicate and/or slow the sales process, and many cardholders may just discard it immediately afterwards thereby creating litter. If an electronic display is available, the account balance could be displayed on such display, however, doing so may raise privacy concerns.

Thus, although technically it may be easier to always print and/or otherwise display the balance, some card holders may not be happy with this. They may feel the amount remaining to be private, and therefore not wish it displayed. They may also not wish others to know that the card they are using is a prepaid product, and not a credit/debit card.

In accordance with some embodiments, one or more of the above concerns is addressed, at least in part, by displaying (which may include, but is not limited to printing) or otherwise providing a human understandable indication of an account balance only after consent is received from a holder.

In some embodiments, the proximity payment device holder provides consent by (i) positioning the proximity payment device within range of the POS system for at least a predetermined amount of time after a reference and/or (ii) actuating a switch supported by the proximity payment device and/or a device in which the proximity payment device may be incorporated.

Figure 1:
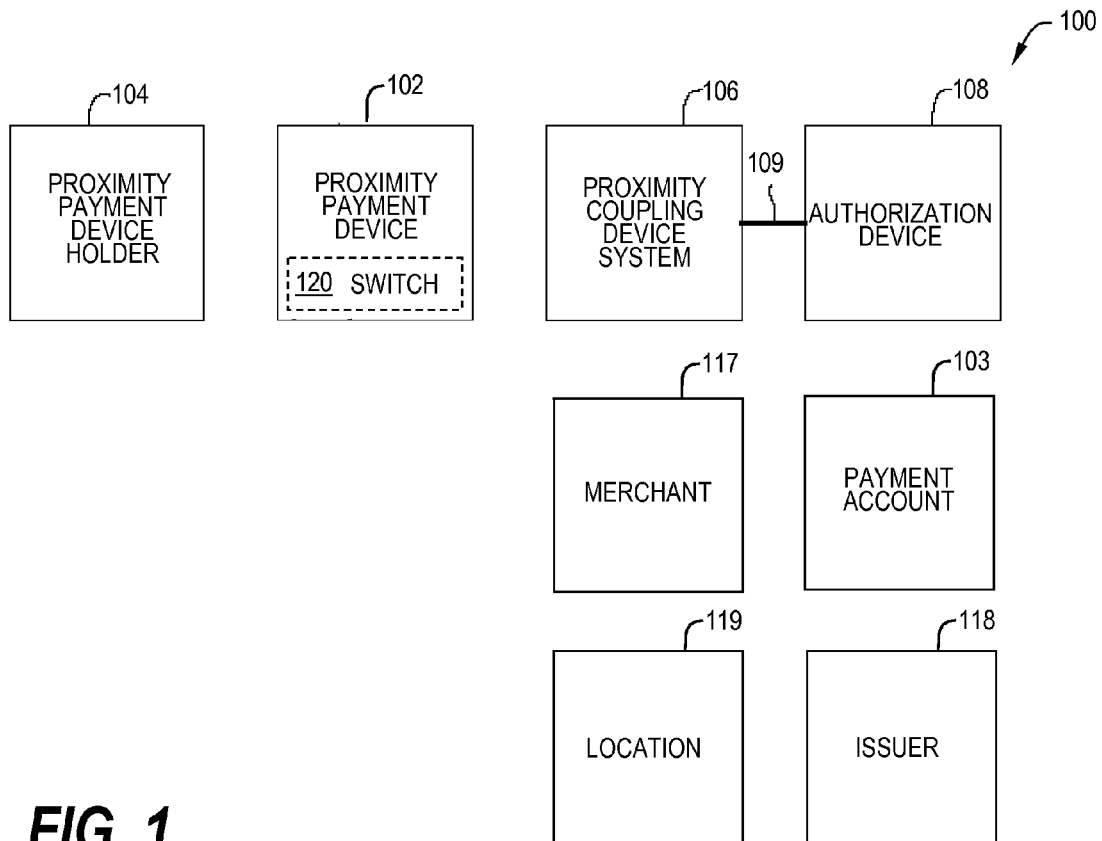
FIG. 1 is a schematic block diagram of a system, according to some embodiments.

FIG. 1 is a schematic block diagram of a system 100, in accordance with some embodiments. Referring to FIG. 1, in accordance with some embodiments, the system 100 includes a proximity payment device 102, a proximity coupling system 106, an authorization device 108 and a communication link 109.

The proximity payment device 102 may be associated with a payment account 103 and may be issued to a proximity payment device holder 104. Unless stated otherwise, a payment account may comprise any type of payment account. In some embodiments, the payment account comprises a prepaid payment account. In some embodiments, the payment account comprises a payment account associated with a bank, a transit system, a theme park and/or a food service.

Unless stated otherwise, the term "issued to" may include, but is not limited to, given to, loaned to, rented to, sold to, transferred to and/or provided to. The term "provided to" may include, but is not limited to, handed to and/or sent to. The term sent to may include, but is not limited to, mailed to. The payment account 103 may comprise a pre-paid payment account and/or any other type of payment account. The proximity payment device holder 104 may include, but is not limited to, any person and/or entity having access to the proximity payment device 102. The proximity payment device holder 104 may also be a holder of the payment account (sometimes referred to herein as an account holder). Unless stated otherwise, the term holder means the proximity payment device holder 104 and/or the account holder.

The proximity coupling system 106 may comprise any type of proximity coupling system. In some embodiments, the proximity coupling system 106 comprises a point of sale (POS) system and/or an entry control system. In some embodiments, an entry control system comprises a turnstile. In some embodiments, the proximity coupling system 106 is disposed in a location 119 operated by a merchant 117.

Some embodiments described hereinafter include a POS system, sometimes referred to as POS system 106. It should be noted, however, that this is not meant to imply that the proximity coupling system 106 is limited to a POS system. As stated above, the proximity coupling system 106 may comprise any type of proximity coupling system.

The authorization device 108 may comprise a website and/or other device operated by and/or on behalf of an issuer 118 of the proximity payment device 102.

The communication link 109 may couple the POS system 106 and the authorization device 108. The communication link 109 may comprise any type of communication link, for example, but not limited to wired (e.g., conductors, fiber optic cables) or wireless (e.g., acoustic links, electromagnetic links or any combination thereof including, for example, but not limited to microwave links, satellite links, infrared links), and/or any combinations thereof. A communication link may be public or private, dedicated and/or shared (e.g., a network) and/or any combination thereof. Thus, a communication link may or may not be a permanent communication link. A communication link may support any type of information in any form, for example, but not limited to, analog and/or digital (e.g., a sequence of binary values, i.e. a bit string) signal(s) in serial and/or in parallel form. The information may or may not be divided into blocks. If divided into blocks, the amount of information in a block may be predetermined or determined dynamically, and/or may be fixed (e.g., uniform) or variable. A communication link may employ a protocol or combination of protocols including, for example, but not limited to the Internet Protocol. In some embodiments, the communication link 109 comprises a telephone line and/or a computer network. In some embodiments, the communication link 109 comprises a payment processing network, such as for example, a payment processing network administered by MasterCard International Incorporated.

As further described below, the proximity payment device 102 may be presented to the POS system 106 and may transmit account data associated with the payment account 103. The POS system 106 may receive the account data and may initiate a payment transaction in response at least thereto. Initiating the payment transaction may include communicating with the authorization device 108 via the communication link 109 to obtain authorization to proceed with the purchase transaction.

In addition, the POS system 106 may receive consent from the proximity payment device holder 104 to provide a human understandable indication of an account balance associated with the payment account 103. The POS system 106 may provide a human understandable indication of the account balance in response at least in part thereto. In some embodiments, the proximity payment device holder provides consent by (i) positioning the proximity payment device 102 within range of the POS system 106 for at least a predetermined amount of time after a reference and/or (ii) actuating a switch 120, which may be supported by the proximity payment device 102. Unless stated otherwise, the term "within range of the POS system" means close enough to the POS system 106 to allow one or two way wireless communication between the proximity payment device 102 and the POS system 106. In some embodiments, the predetermined amount of time is two seconds and/or about two seconds. In some embodiments, the reference comprises an audible and/or visible indication provided to the proximity payment device holder 104. In some embodiments, the reference is a point in time that the proximity payment device holder first positions the proximity payment device 102 within range of the POS system 106.

Unless stated otherwise, an account balance may comprise any type of account balance. In some embodiments, an account balance comprises monetary balance and/or a benefit balance. In some embodiments, a benefit balance comprises a number of benefits that the holder is entitled to receive. In some embodiments, a number of benefits that the holder is entitled to receive comprises a number of trips that a holder is entitled to receive on a transit system, a number of rides that a holder is entitled to receive in a theme park and/or an amount of food and/or drink that a holder is entitled to receive from a food service.

In some embodiments, the POS system 106 receives data indicative of a preferred method to provide a human understandable indication of the account balance. In some embodiments, the preference data indicates a preference to have the account balance indicated by (i) printing the account balance on a paper receipt and/or other media, (ii) displaying the account balance on an electronic display device viewable by the proximity payment device holder 104, (iii) displaying the account balance on an electronic display device viewable by an operator of the POS system 106 who reads the account balance and thereafter verbally informs the proximity payment device holder of the account balance and/or (iv) indicating the account balance using machine generated speech. The POS system 106 may provide a human understandable indication of the account balance in accordance therewith.

Figure 2A:
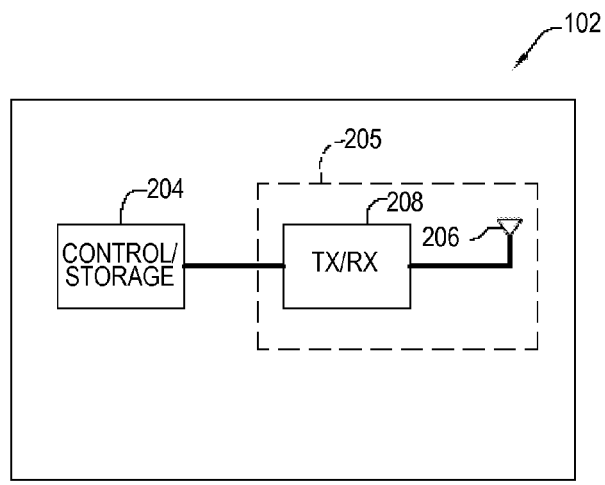
FIG. 2A is a schematic block diagram of a proximity payment device, according to some embodiments.

FIG. 2A is a schematic block diagram of the proximity payment device 102, according to some embodiments. Referring to FIG. 2A, in accordance with some embodiments, the proximity payment device 102 may include control/storage circuitry 204 and a wireless communication interface 205.

The control/storage circuitry 204 may store a payment account number and/or other information to be transmitted to the POS system 106. In some embodiments, such information includes one or more portions of the information described below with respect to FIG. 2B.

The wireless communication interface 205 may allow the proximity payment device 102 to transmit signals to the POS system 106 and/or to receive signals from the POS system 106. The signals transmitted by the wireless communication interface 205 may include a payment account number and/or other information stored in the control/storage circuitry 204. The signals received by the wireless communication interface may include an interrogation, a power signal and/or other signals.

The control storage circuitry 204 may comprise any type of control/storage circuitry. For example, the control/storage circuitry 204 may be programmable or non programmable, general purpose or special purpose, dedicated or non dedicated, distributed or non distributed, shared or not shared, and/or any combination thereof. Control/storage circuitry may include, but is not limited to, hardware, software, firmware, and/or any combination thereof. Hardware may include, but is not limited to off the shelf integrated circuits, custom integrated circuits and/or any combination thereof. In some embodiments, control/storage circuitry comprises a microcontroller and/or any other type of microprocessor. Software may include, but is not limited to, instructions that are storable and/or stored on a computer readable medium, such as, for example, magnetic or optical disk, magnetic or optical tape, CD-ROM, DVD, RAM, EPROM, ROM or other semiconductor memory. Control/storage circuitry may employ continuous signals, periodically sampled signals, and/or any combination thereof. If control/storage circuitry is distributed, two or more portions of the control/storage circuitry may communicate with one another through a communication link.

In some embodiments, the control/storage circuitry 204 comprises a simple memory device capable only of responding to a pre-defined set of commands. In some other embodiments, the control/storage circuitry 204 comprises a secure microcontroller capable of executing a pre-defined program.

The wireless communication interface 205 may comprise an antenna 206 and transmit/receive circuitry 208. The antenna 206 may be configured to transmit and receive radio frequency (RF) signals and may comprise a loop antenna and/or any other suitable configuration. The transmit/receive circuitry 208 may be coupled between the antenna 206 and the control/storage circuitry 204.

In some embodiments, the control/storage circuit 204 and the transmit/receive circuitry 208 are disposed in a single integrated circuit. In some embodiments, the single integrated circuit comprises an RFID IC. Unless stated otherwise, the term RFID is not limited to a specific type of RFID. In some embodiments, an RFID is a simple memory device capable only of responding to a pre-defined set of commands. In some other embodiments, an RFID comprises a microcontroller capable of executing a program. In some embodiments, an RFID IC comprises an IC that uses contactless technology, such as, for example, as specified in international standard ISO/IEC 14443. Some embodiments may include additional features and/or other configurations altogether.

In operation, wireless signals (e.g., RF signals) may be received by the antenna 206 and supplied to the transmit/receive circuitry 208, which in response may provide signals that are supplied to the control/storage circuitry 204. The control/storage circuitry 204 may also provide signals that are supplied to the transmit/receive circuitry 208, which in response may provide signals that are supplied to the antenna 206 and transmitted thereby.

In some embodiments, the control/storage circuitry 204 and/or the wireless communication interface 205 are configured to allow the proximity payment device 102 to operate in accordance with the above-mentioned "PayPass" standard.

Figure 2B:
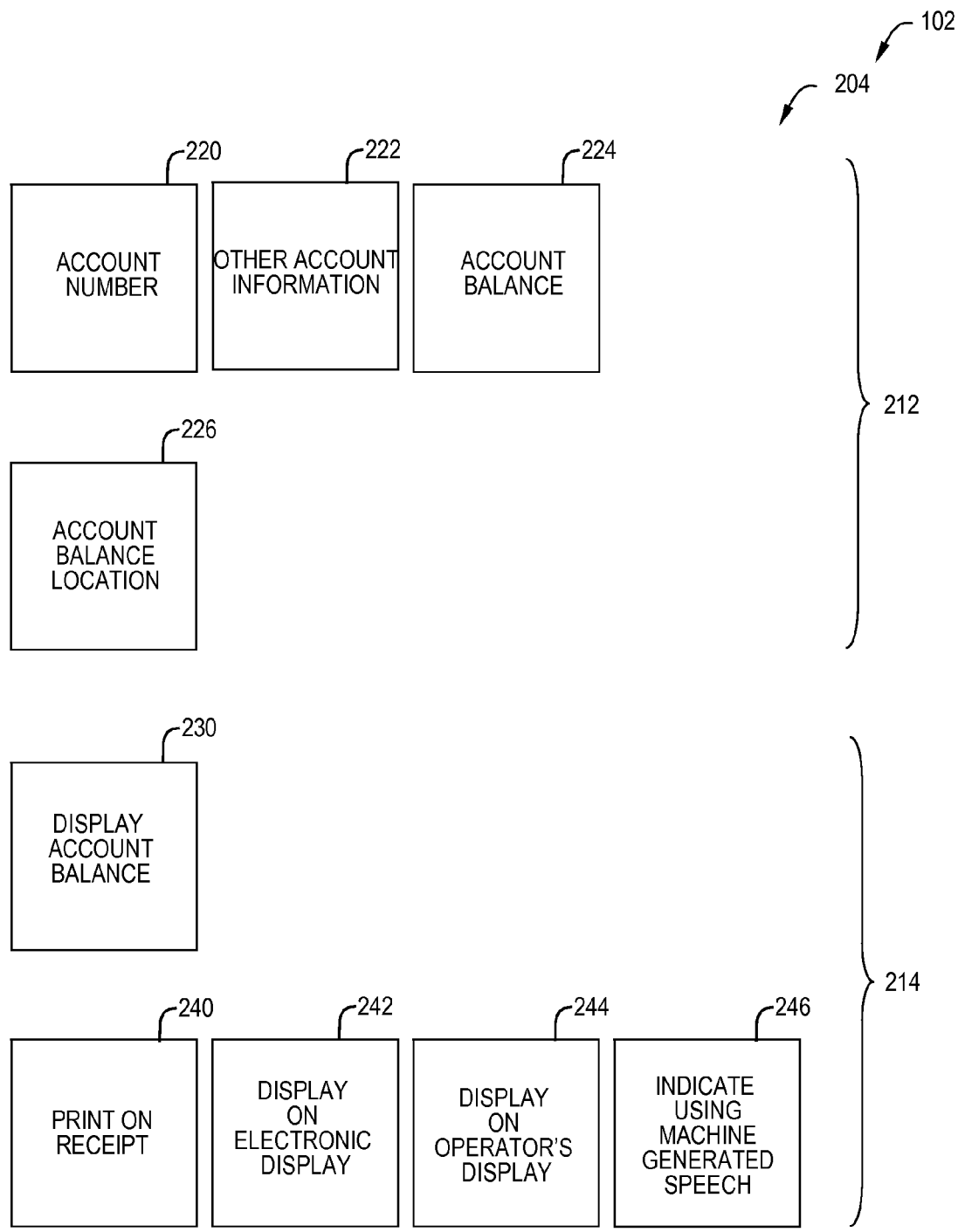
FIG. 2B is a schematic block diagram of a portion of a proximity payment device, according to some embodiments.

FIG. 2B is a schematic block diagram of data that may be stored in the proximity payment device 102, in accordance with some embodiments. Referring to FIG. 2B, in accordance with some embodiments, the proximity payment device 102 may include account data 212 and preference data 214.

The account data 212 may include data to be transmitted to a POS system 106 and/or used by the POS system 106 to initiate a payment transaction associated with a payment account 103. In some embodiments, the account data 212 includes an account number 220 and other account information 222.

The account number 220 may be an account number (sometimes referred to herein as a payment account number) of a payment account 103 associated with the proximity payment device 102. The other information 222 may include an expiration date.

The account data 212 may further include an account balance 224 and/or account balance location data 226. The account balance data 224 may indicate an account balance associated with the payment account 103. The account balance location data 226 may indicate where the account balance is stored. In some embodiments, the account balance is stored in the proximity payment device 102. In some embodiments, the account balance is stored by the issuer 118. In some embodiments, the account balance is stored partially in the proximity payment device 102 and partially by the issuer 118.

The preference data 214 may include data 230 indicative of whether or not there is consent from a proximity payment device holder 104 to display and/or otherwise provide a human understandable indication of the account balance associated with the payment account 103.

The preference data 214 may also or may alternatively include data indicative of a preferred method to display and/or otherwise provide a human understandable indication of the account balance associated with the payment account 103. The data indicative of a preferred method may include (i) data 240 indicative of a preference to have the account balance printed on a paper receipt and/or other media, (ii) data 242 indicative of a preference to have the account balance displayed on an electronic display device viewable by the proximity payment device holder 104, (iii) data 244 indicative of a preference to have the account balance displayed on an electronic display device viewable by an operator of the POS system 106 who reads the account balance and thereafter verbally informs the proximity payment device holder of the account balance and/or (iv) data 246 indicative of a preference to have the account balance indicated using machine generated speech.

The preference data 214 may also or may alternatively include data indicative of a preferred order of methods to display the account balance. The data indicative of a preferred order of methods may include (i) data 240 indicating that a first method (e.g., printing the account balance on a paper receipt and/or other media) is a preferred method to display the account balance, (ii) data 242 indicating that a second method (e.g., displaying the account balance on an electronic display device viewable by the proximity payment device holder 104) is a preferred method if the first method is not available, (iii) data 244 indicating that a third method (e.g., displaying the account balance on an electronic display device viewable by an operator of the POS system 106 who reads the account balance and thereafter verbally informs the proximity payment device holder of the account balance) is a preferred method if the first method and the second method are not available, and so on.

In some embodiments, the data indicative of a preferred order of methods is in the form of an ordered list that identifies a preferred order of methods that may be used to provide a human understandable indication of the account balance. In some embodiments, the ordered list comprises data 240, data 242, data 244 and data 246. In some embodiments, each element of the list indicates a method that may be used to provide a human understandable indication of the balance. The order of the elements may indicate the preferred order of the methods. In some embodiments, the first element (e.g., data 240) in the list is the most preferred method of providing a human understandable indication of the account balance, the second element (e.g., data 242) in the list is the next most preferred method of providing a human understandable indication of the account balance, and so on. In some embodiments, the POS system does not provide a human understandable indication of the account balance if the list is either absent or empty.

In some embodiments, each data element has a default value when the proximity payment device is issued to the proximity payment device holder. In some embodiments, the default value of a data element is defined by the issuer of the proximity payment device. In some embodiments, the issuer arranges for the proximity payment device holder to have the capability to change the value of one or more of the data elements. If the proximity payment device 102 is supported by a some embodiments, the In some embodiments, the proximity payment device does not include preference data. Thus, preference data is not required in every embodiment.

In some embodiments, the account balance location data 226 and the preferred order of methods data 240, 242, 244 are stored in a record. If the proximity payment device 102 operates in accordance with the "PayPass M/chip" standard, the account balance location data 226 and the preferred order of methods data 240, 242, 244 may be stored in both SFI 1 record 1 and SFI 2 record 1. If the proximity payment device 102 operates in accordance with the "PayPass mag stripe" standard, the account balance location data 226 and the preferred order of methods data 240, 242, 244 may be stored in SFI 1 record 1.

Figure 2C:
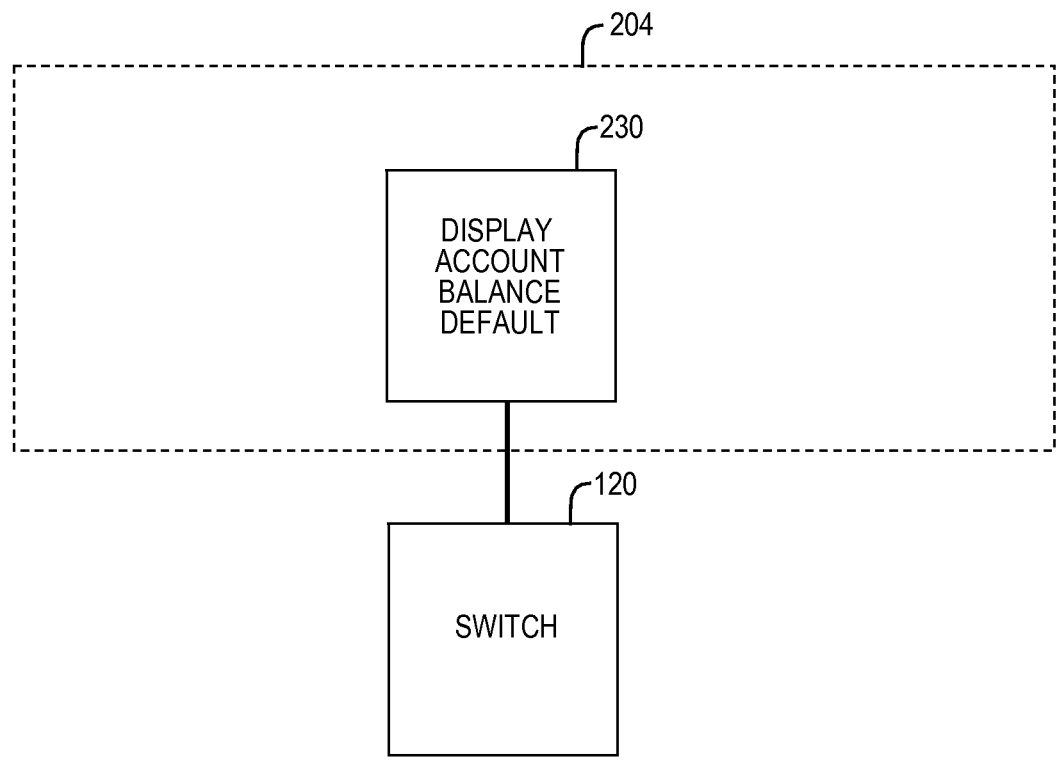
FIG. 2C is a schematic block diagram of a switch and a portion of a proximity payment device, according to some embodiments.

FIG. 2C is a schematic block diagram of a portion of a proximity payment device, according to some embodiments. Referring to FIG. 2C, in some embodiments, the control/storage circuitry 204 may be coupled to a switch 120. The control/storage circuitry 204 may receive a signal from the switch 120, and in response at least in part thereto, may generate the data 230 indicative of whether or not there is consent from the proximity payment device holder. In some embodiments, a proximity payment device holder 104 may actuate the switch 120 to indicate consent to provide a human understandable indication of the account balance.

In some other embodiments, the reverse could be implemented. Thus, in some embodiments, the proximity payment device holder 104 may actuate the switch 120 to indicate no consent to provide a human understandable indication of the account balance.

Figure 3:
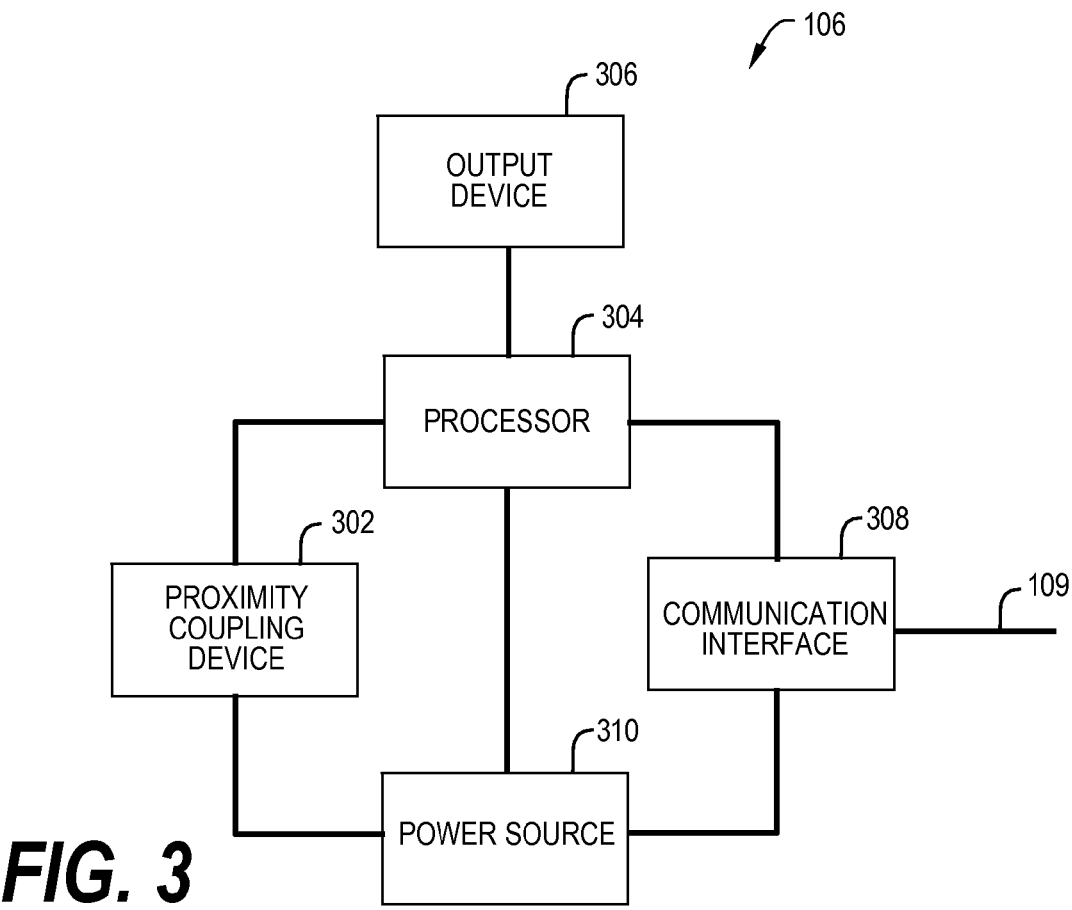
FIG. 3 is a schematic block diagram of a point of sale system, according to some embodiments.

FIG. 3 is a schematic block diagram of the POS system 106, according to some embodiments. Referring to FIG. 3, in accordance with some embodiments, the POS system 106 includes a proximity coupling device 302, a processor 304, an output device 306, a communication interface 308 and a power supply 310.

As further described hereinafter, the proximity coupling device 302 may include circuitry and/or other components to perform wireless communication with a proximity payment device 102.

The processor 304 may comprise any type of processor. For example, a processor may be programmable or non programmable, general purpose or special purpose, dedicated or non dedicated, distributed or non distributed, shared or not shared, and/or any combination thereof. A processor may include, but is not limited to, hardware, software, firmware, and/or any combination thereof. Hardware may include, but is not limited to off the shelf integrated circuits, custom integrated circuits and/or any combination thereof. In some embodiments, a processor comprises a microprocessor. Software may include, but is not limited to, instructions that are storable and/or stored on a computer readable medium, such as, for example, magnetic or optical disk, magnetic or optical tape, CD-ROM, DVD, RAM, EPROM, ROM or other semiconductor memory. A processor may employ continuous signals, periodically sampled signals, and/or any combination thereof. If a processor is distributed, two or more portions of the processor may communicate with one another through a communication link.

The output device 306 may comprise any type of output device. In some embodiments, the output device 306 comprises a printer. In some embodiments, the output device 306 comprises an electronic display device to display visual information. In some embodiments, an electronic display device comprises a liquid crystal display. In some embodiments, the output device 306 comprises a speaker and/or other acoustic device to output machine generated speech. In some such embodiments, the processor 304 generates signals that are supplied to the speaker and/or other acoustic device, which outputs machine generated speech in response thereto. In some embodiments, a sound and/or speech generator is employed.

As further described herein, in some embodiments, the output device 306 is used to provide a human understandable indication of an account balance of a payment account. Unless stated otherwise, the phrase "provide a human understandable indication of an account balance" means provide a human understandable indication of an account balance in any way. Some embodiments provide a human understandable indication of the account balance by displaying the account balance. Unless stated otherwise, displaying means displaying in any way. In some embodiments, displaying comprises printing on paper and/or other media. The paper and/or other media may comprise a receipt for a purchase transaction. In some embodiments displaying comprises displaying on an electronic display device. In some embodiments, providing a human understandable indication of an account balance comprises indicating the account balance using machine generated speech. In some embodiments, machine generated speech may be particularly useful if the proximity payment device holder happens to be visually impaired.

In operation, the proximity coupling device 302 may receive signals from the proximity coupling device and/or transmit signals to the proximity payment device 102. The proximity coupling device 302 may also receive signals from the processor 304 and/or transmit signals to the processor 304. The processor 304 may receive signals from and/or transmit signals to the proximity coupling device 302, the output device 304 and/or the communication interface 310.

Although the proximity coupling device 302, the processor 304, the output device 306 and the communication interface 310 are shown separate from one another, in some embodiments, the proximity coupling device 302, the processor 304, the output device 306 and/or the communication interface 310 may share one or more circuits and/or other components.

The power source 310 may be coupled (directly and/or indirectly) and/or supply power (directly and/or indirectly) to the proximity coupling device 302, the processor 304, the output device 306, and/or the communication interface 308.

Figure 4:
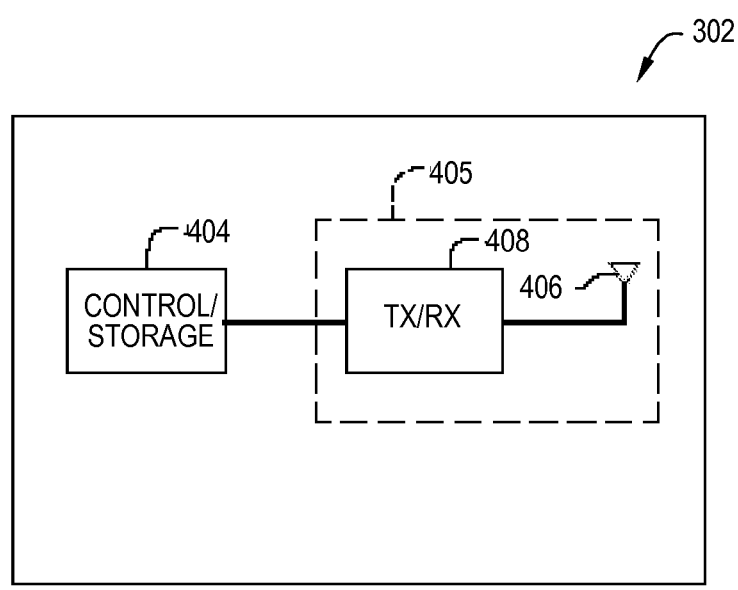
FIG. 4 is a schematic block diagram of a proximity coupling device, according to some embodiments.

FIG. 4 is a schematic block diagram of the proximity coupling device 302, according to some embodiments. Referring to FIG. 4, in accordance with some embodiments, the proximity coupling device 302 includes control/storage circuitry 404 and a wireless communication interface 405.

The control storage circuitry 404 may comprise any type of control/storage circuitry. In some embodiments, the control/storage circuitry 404 comprises a simple memory device capable only of responding to a pre-defined set of commands. In some other embodiments, the control/storage circuitry 404 comprises a secure microcontroller capable of executing a pre-defined program.

In some embodiments, the wireless communication interface 405 comprises an antenna 406 and transmit/receive circuitry 408. The antenna 406 may be configured to transmit and receive radio frequency (RF) signals and may comprise a loop antenna and/or any other suitable configuration. The transmit/receive circuitry 408 may couple the antenna 406 to the control/storage circuitry 404.

The wireless communication interface 405 may allow the proximity coupling device 302 to transmit signals to a proximity payment device 102 within range of the proximity coupling device 302 and/or to receive signals from a proximity payment device 102 within range of the proximity coupling device 302.

In some embodiments, a proximity payment device is within range of the proximity coupling device 302 and/or POS system 106 if a wireless communication interface 205 of the proximity payment device 102 is positioned in a field generated by the wireless communication interface 405 of the proximity coupling device.

In some embodiments, the control/storage circuit 404 and the transmit/receive circuitry 408 are disposed in a single integrated circuit.

In some embodiments, the control/storage circuit 404 and the transmit/receive circuitry 408 are disposed in an IC that uses NFC technology, such as, for example, an NFC IC compliant with ISO/IEC 18092/ECMA-340 or ISO/IEC 21481/ECMA-352.

In operation, wireless signals (e.g., RF signals) may be received by the antenna 406 and supplied to the transmit/receive circuitry 408, which in response may provide signals that are supplied to the control/storage circuitry 404. The control/storage circuitry 404 may also provide signals that are supplied to the transmit/receive circuitry 408, which in response, may provide signals that are supplied to the antenna 406 and transmitted thereby.

In some embodiments, the control/storage circuitry 404 and/or the wireless communication interface 405 are configured to allow the proximity coupling device 302 to operate in accordance with the above-mentioned "PayPass" standard.

Figure 5A:
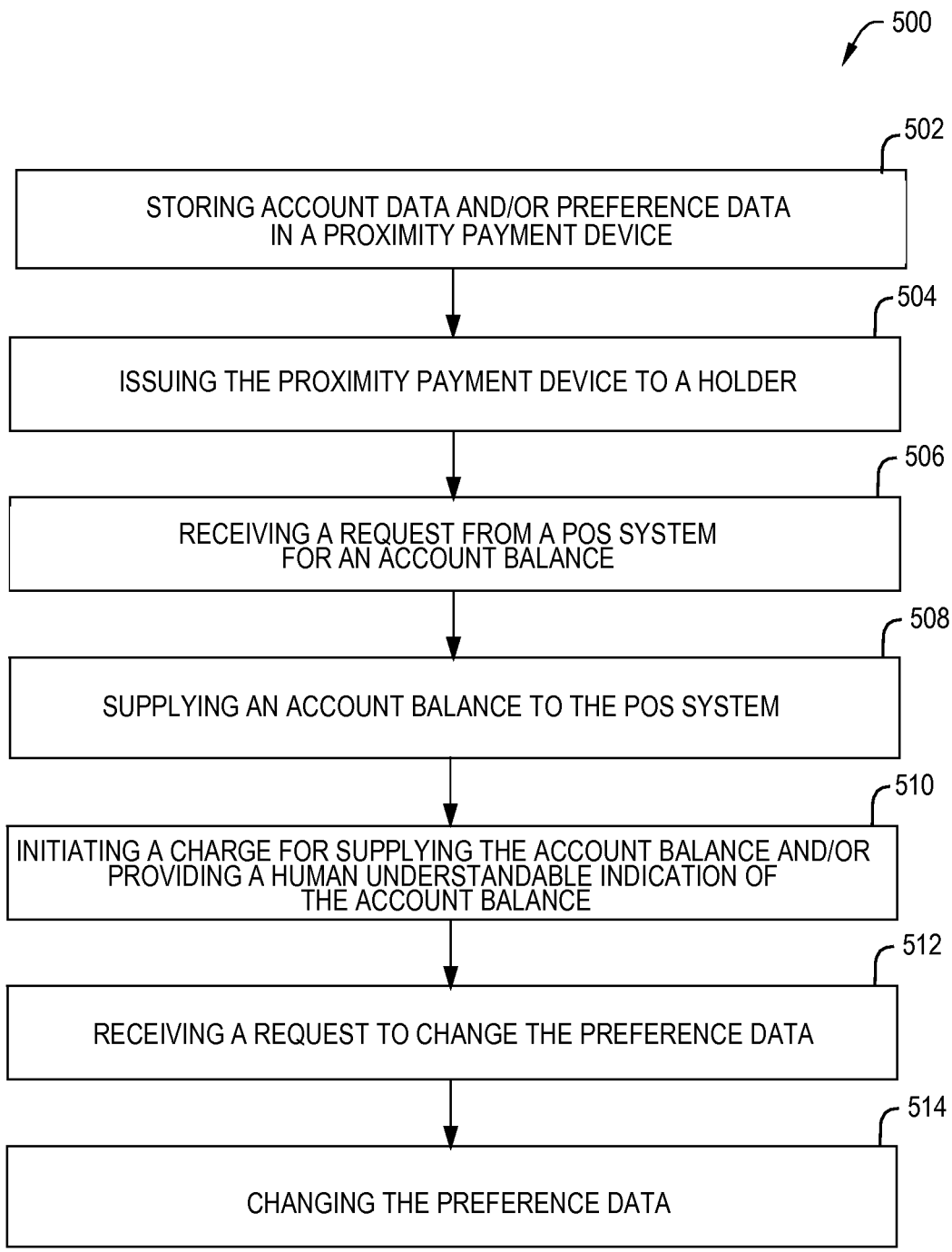
FIG. 5A is a flow chart that illustrates a method, according to some embodiments.

FIG. 5A is a flow chart 500 of a method according to some embodiments. In some embodiments, one or more portions of the method may be performed in association with the proximity payment device 102. In some embodiments, one or more portions of the method may be performed by an issuer 118 of the proximity payment device 102. The method is not limited to the order shown in the flow chart. Rather, embodiments of the method may be performed in any order that is practicable. For that matter, unless stated otherwise, any method disclosed herein may be performed in any order that is practicable. Notably, some embodiments may employ one or more portions of the method without one or more other portions of the method.

At 502, the method may include storing account data and/or preference data in a proximity payment device issued, and/or to be issued, to a proximity payment device holder. In some embodiments, the account data includes a payment account number and/or other information. In some embodiments, the preference data includes data indicative of a preferred method to provide a human understandable indication of an account balance associated with a payment account. In some embodiments, the preference data includes data indicative of a preferred order of methods to provide a human understandable indication of the account balance.

In some embodiments one or more portions of the account data and/or preference data is stored in the course of personalization and/or pre-personalization of the proximity payment device. As is known, personalization and/or pre-personalization of the proximity payment device may include storing information such as keys to be used in subsequent transactions and/or parameters to be used to select a particular card brand to be borne by the proximity payment device. This may include writing information such as loading of keys to be used in subsequent transactions and parameters (such as to select a particular card brand to be borne by the proximity payment device) into the control/storage circuitry 204 (FIG. 2) of the proximity payment device.

Personalization and/or pre-personalization of the proximity payment device may include assigning the proximity payment device to a particular payment account and/or a particular account holder by storing information in the proximity payment device. In some embodiments, this may include writing a payment card account number and/or other information into the control/storage circuitry 204 (FIG. 2) of a proximity payment device.

Other information, such as expiration date, may be stored during personalization and/or pre-personalization. Personalization and/or per-personalization may further include marking the payment account number and/or any other information (or a portion thereof) that was (or is to be) stored in the proximity payment device 102 on a surface of the proximity payment device 102. In some embodiments, personalization is carried out using contactless card programming equipment commonly used to program proximity payment cards, such as for example, a model 9000 available from Datacard Group.

At 504, the method may further include issuing the proximity payment device to a proximity payment device holder. In some embodiments, issuing the proximity payment device comprises giving, loaning, renting, selling, transferring and/or providing the proximity payment device to the proximity payment device holder. Providing the proximity payment device to the proximity payment device holder may include handing and/or sending the proximity payment device to the proximity payment device holder. Sending the proximity payment device to the proximity payment device holder may include mailing the proximity payment device to the proximity payment device holder.

At 506, the method may further include receiving a request from a POS system for an account balance associated with a payment account.

At 508, the method may further include supplying the account balance to the POS system.

At 510, the method may further include initiating a charge for supplying and/or providing a human understandable indication of the account balance. In some embodiments, an amount charged may be shared between parties. In some embodiments, the parties include the issuer, an acquirer and/or the merchant.

At 512, the method may further include receiving a request to change preference data in a proximity payment device. In some embodiments, receiving the request comprises receiving the request via a website, a telephone, and/or mail.

In some embodiments, the request is supplied, directly and/or indirectly, by a proximity payment device holder. In some embodiments, the proximity payment device holder may supply the request via a website, a telephone, mail and/or any other method. If the proximity payment device holder is supplying the request via a website, the proximity payment device holder may employ a user interface. In some embodiments, a user interface may include a computer that executes a browser program, receives signals from one or more input devices, for example, a mouse and/or keyboard, supplies signals to one or more output devices, for example, a display, and forwards the request via the website.

At 514, the method may further include changing the preference data in response at least in part to the request. In some embodiments this includes updating the preference data on the proximity payment device. In some other embodiments, the issuer may issue a replacement proximity payment device with the updated preference data.

Updating preference data on the proximity payment device requires a way to communicate the updated preference data to the proximity payment device. If the proximity payment device comprises a proximity payment card having a contact interface, the updated preference data may be communicated to the proximity payment card using a method sometimes referred to as "issuer scripting". In such method, changes are communicated to a proximity payment card via a POS system after the proximity payment card is used in a payment transaction.

Figure 5B:
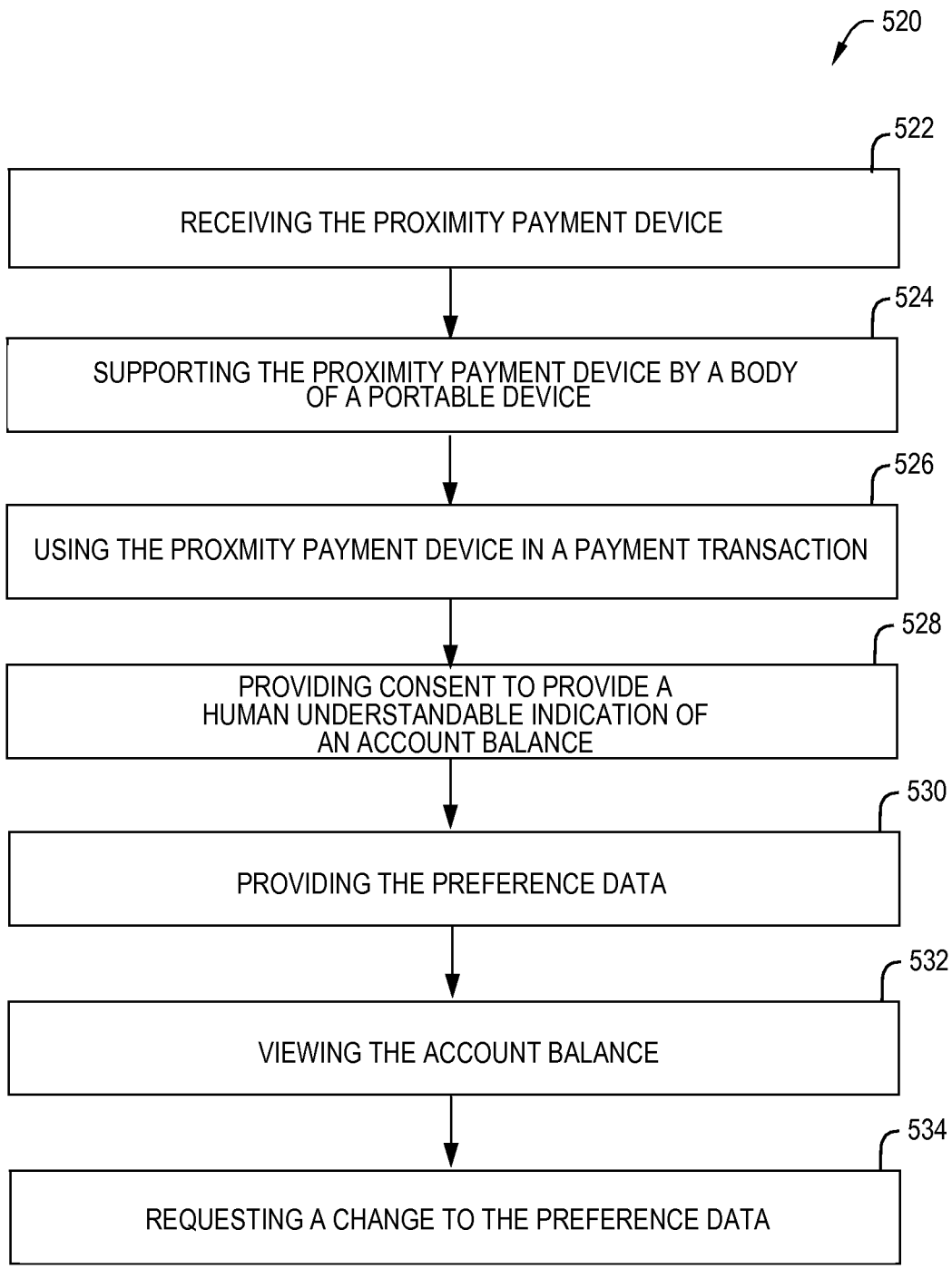
FIG. 5B is a flow chart that illustrates a method, according to some embodiments.

FIG. 5B is a flow chart 520 of a method according to some embodiments. In some embodiments, one or more portions of the method may be performed by the proximity payment device holder 104 (FIG. 1). In some embodiments, one or more portions of the method may be performed in association with the proximity payment device 102, the POS system 106, and/or the authorization device 108 (FIG. 1).

At 522, the method may include receiving the proximity payment device. In some embodiments, the proximity payment device comprises the proximity payment issued at 504 of the flow chart 500 (FIG. 5A).

At 524, the method may further include supporting the proximity payment device by a body of a portable device. In some embodiments, the portable device comprises a portable device issued, and/or to be issued, to the proximity payment device holder. In some embodiments, the portable device comprises a cell phone, a music player, a video player, a PDA, a wristwatch, a wristband, a bracelet, a pendant, a key fob and/or any other type of portable device.

At 526, the method may further include using the proximity payment device in a payment transaction. In some embodiments, this is carried out in accordance with the above-mentioned "PayPass" standard. For example, the proximity payment device may be presented to the proximity coupling device and the proximity coupling device may transmit an interrogation signal in response at least thereto. The proximity payment device may receive the interrogation signal via an antenna 206 (FIG. 2A). The interrogation signal may cause the circuitry of the proximity payment device to be powered-up. For example, the proximity payment device may include circuitry to rectify the received interrogation signal to generate DC power that may be used to power the control/storage circuitry 204 (FIG. 2) and transmit/receive circuitry 208 (FIG. 2). The proximity payment device may transmit one or more signals to the proximity coupling device in response to the interrogation signal. The one or more signals may be transmitted via the antenna 206 (FIG. 2) and may include a payment card account number and/or other information required for interaction with the proximity coupling device. In some embodiments, the proximity payment device may transmit the payment card account number and/or other information after a handshake procedure or the like with the POS terminal. This may include communicating with a payment card system to initiate a payment transaction against the payment card account represented by the payment card account number received from the proximity payment device. In some embodiments, the payment card system includes the authorization device 108 (FIG. 1).

In some embodiments, the proximity payment device may be presented to the proximity coupling device by positioning the proximity payment device within wireless communication range of the proximity coupling device. In some embodiments, the proximity payment device may be presented to the proximity payment device by positioning the proximity payment device in physical contact with, and/or by tapping a portion of the proximity payment device on, the proximity coupling device.

In some embodiments, a proximity payment device may be selectively enabled/disabled in order to enable and/or disable operation of the proximity payment device. In some embodiments, a proximity payment device may be presented to a proximity coupling device before, during and/or after enabling operation of the proximity payment device.

At 528, the method may further include providing consent to provide a human understandable indication of an account balance associated with the payment account. In some embodiments, the proximity payment device holder may use the proximity payment device to provide such consent. In some embodiments, this may include positioning the proximity payment device within range of the proximity coupling device for at least a predetermined amount of time after a reference.

In some embodiments, the predetermined amount of time is two seconds and/or about two seconds. In some embodiments, the reference comprises an audible and/or visible indication provided to the proximity payment device holder after the account data is received. In some embodiments, this embodiment has the advantage of not requiring any additional functionality in the proximity payment device.

In some other embodiments, the reverse could be implemented. Thus, in some embodiments, a proximity payment device holder may provide consent by not positioning the proximity payment device 102 within range of the proximity coupling device 302 for a predetermined amount of time after the reference.

In some such embodiments, the proximity payment device holder may hold and/or otherwise position the proximity payment device 102 within range of the proximity coupling device 302 to, in effect, provide an indication that is opposite of the data 230 stored on the proximity payment device 102. For example, if the data 230 indicates that there is no consent to display the account balance, the proximity payment device holder may provide consent by positioning the proximity payment device 102 within range of the proximity coupling device 302 for a predetermined amount of time after a reference. If instead, the data 230 indicates that there is consent, the proximity payment device holder may indicate that there is no consent by positioning the proximity payment device 102 within range of the proximity coupling device 302 for a predetermined amount of time after a reference.

In some embodiments, one some or all of the above methods may be employed even if the proximity payment device is a conventional proximity payment device.

In some embodiments, the consent is based at least in part on whether a proximity payment device holder has actuated a switch. In some embodiments, the switch 120 comprises a switch supported by the proximity payment device 102. In some embodiments, the proximity payment device holder may provide consent by actuating the switch. In some other embodiments, the reverse could be implemented. Thus, in some embodiments, a proximity payment device holder may provide consent by not actuating the switch. In some embodiments, the value and/or state of the data 230 depends at least in part on whether the switch 120 is actuated.

At 530, the method may include providing the preference data to the POS system. In some embodiments, the preference data is included in the consent provided at 528. In some other embodiments, the preference data is not included in the consent provided at 528.

At 532, the method may further include viewing the account balance. If the account balance is printed on a paper receipt and/or other media, viewing may include reading the account balance on the paper receipt and/or other media. If the account balance is displayed on an electronic display device, viewing may include reading the account balance on the electronic display device.

At 534, the method may further include requesting a change to preference data in the proximity payment device. In some embodiments, the requesting is performed directly and/or indirectly, by a proximity payment device holder. If the proximity payment device holder requests the change, the proximity payment device holder may request the change via a website, a telephone, mail and/or any other method. If the proximity payment device holder performs the request via a website, the proximity payment device holder may employ a user interface.

Figure 5C:
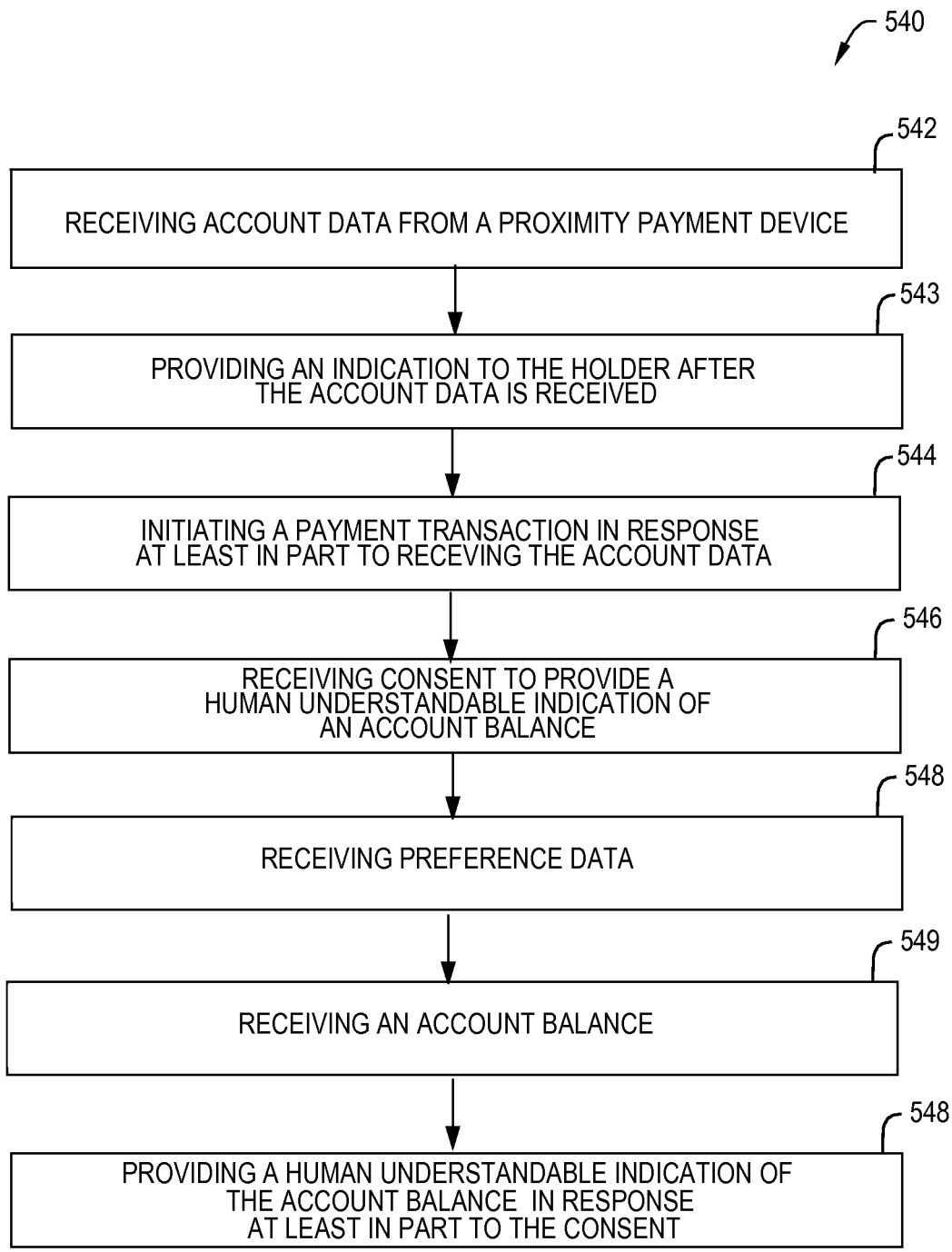
FIG. 5C is a flow chart that illustrates a method, according to some embodiments.

FIG. 5C is a flow chart 540 of a method according to some embodiments. In some embodiments, one or more portions of the method may be performed by the POS system 106 (FIG. 1). In some embodiments, one or more portions of the method may be performed in association with the proximity payment device 102, the POS system 106, and/or the authorization device 108 (FIG. 1).

At 542, the method may include receiving, in a POS system, account data from a proximity payment device. In some embodiments, this is carried out in accordance with the above-mentioned "PayPass" standard. For example, the proximity payment device may be presented to the proximity coupling device and the proximity coupling device may transmit an interrogation signal in response at least thereto. The proximity payment device may receive the interrogation signal and may transmit one or more signals in response thereto. The one or more signals may include a payment card account number and/or other information required for interaction with the proximity coupling device. In some embodiments, the proximity payment device may transmit the payment card account number and/or other information after a handshake procedure or the like with the POS terminal.

In some embodiments, the account data includes an account number associated with a payment account and/or other information. In some embodiments, the account holder is the same as the proximity payment device holder. In some embodiments, the account data includes all account data needed to initiate a payment transaction associated with the payment account.

At 543, the method may further include providing an indication to the proximity payment device holder after the account data is received. In some embodiments, the indication comprises an audible and/or visible indication.

At 544, the method may include initiating a payment transaction in response at least in part to receiving the account data from the proximity payment device. This may include communicating with a payment card system to initiate a payment transaction against the payment card account represented by the payment card account number received from the proximity payment device. In some embodiments, the payment card system includes the authorization device 108 (FIG. 1).

At 546, the method may further include receiving, in the POS system, consent to provide a human understandable indication of an account balance associated with the payment account. In some embodiments, receiving consent comprises receiving consent provided via the proximity payment device.

In some embodiments, this includes determining that the proximity payment device has been held and/or otherwise positioned within range of the point of sale system for at least a predetermined amount of time after a transaction and/or other reference. In some embodiments, the predetermined amount of time is two seconds and/or about two seconds. In some embodiments, the reference comprises an audible and/or visible indication provided to the proximity payment device holder after the account data is received.

In some other embodiments, the reverse could be implemented. Thus, in some embodiments, a proximity payment device holder may provide consent by not positioning the proximity payment device 102 within range of the proximity coupling device 302 for a predetermined amount of time after the reference.

In some such embodiments, the proximity payment device holder may hold and/or otherwise position the proximity payment device 102 within range of the proximity coupling device 302 to, in effect, provide an indication that is opposite of the data 230 stored on the proximity payment device 102.

In some embodiments, the POS system 106 may receive the data indicative of whether there is consent and the POS system 106 may invert the state of such data if the proximity payment device 102 is positioned within range of the proximity coupling device 302 for a predetermined amount of time after a reference.

In some embodiments, receiving consent provided via the proximity payment device comprises receiving consent based at least in part on whether a proximity payment device holder has actuated a switch. In some embodiments, the switch comprises a switch 120 supported by the proximity payment device 102. In some embodiments, the proximity payment device holder may provide consent by actuating the switch. In some other embodiments, the reverse could be implemented. Thus, in some embodiments, a proximity payment device holder may provide consent by not actuating the switch. In some embodiments, the value and/or state of the data 230 indicative of whether or not there is consent depends at least in part on whether the switch 120 is actuated.

In some embodiments, the POS system 106 retrieves the data 230 indicative of whether there is consent and the POS system 106 as soon as the proximity payment device 102 is activated and/or positioned within range of the proximity coupling device 302. Thus, in some embodiments, the proximity payment device holder must actuate the switch prior to positioning the proximity payment device within range of the proximity coupling device.

In some embodiments, a POS system 106 uses a GET DATA, READ RECORD or other similar command to retrieve the data 230 indicative of whether or not there is consent from a proximity payment device holder 104 to display the account balance.

In some embodiments, the data 230 is retrieved only if the data indicative of a preferred order of methods (e.g., data 240, data 242 and/or data 244) is present.

At 548, the method may further include receiving preference data from the proximity payment device. In some embodiments, the preference data is indicative of a preferred method to provide a human understandable indication of the account balance. In some embodiments, the preference data is indicative of a preferred order of methods to provide a human understandable indication of the account balance.

In some embodiments, data indicative of a preferred order of methods includes (i) data indicating that a first method is a preferred method and (ii) data indicating that a second method is a preferred method if the first method is not available. The data indicative of the preferred order may further include data indicating that a third method is a preferred method if the first method and the second method are not available, and so on.

At 549, the method may include receiving the account balance. In some embodiments, the account balance is received from the proximity payment device. In some embodiments, the account balance is received from the issuer of the proximity payment device. In some embodiments, the account balance is received partially from the proximity payment device and partially from the issuer.

In some embodiments, if the account data 212 includes the account balance 224 (e.g., as indicated by the account balance location data 226), a POS system 106 issues a suitable command to the proximity payment device 102 to retrieve the account balance 224 therefrom.

In some embodiments, if the account data 212 does not include the account balance 224, the POS system 106 may obtain the account balance by issuing a request to an issuer 118 (of the proximity payment device 102) to retrieve the account balance therefrom.

In some embodiments, the POS system 106 may (i) issue a suitable command to the proximity payment device 102 to retrieve at least a portion of the account balance 224 therefrom, and (ii) issue a request to the issuer 118 to retrieve at least a portion of the account balance therefrom.

Some embodiments receive the account balance only if there is consent to display the account balance.

At 550, the method may further include providing a human understandable indication of the account balance via an output device, in response at least in part to the consent. The output device may comprise any type of output device or devices. In some embodiments, the output device comprises a printer, an electronic display device, and/or a speaker.

In some embodiments, providing a human understandable indication of the account balance comprises printing the account balance. In some embodiments, providing a human understandable indication of the account balance comprises displaying the account balance on an electronic display device. In some embodiments, providing a human understandable indication of the account balance comprises displaying the account balance to an operator of the point of sale system who thereafter verbally informs the proximity payment device holder of the account balance. In some embodiments, providing a human understandable indication of the account balance comprises indicating the account balance using machine generated speech.

If the method includes receiving preference data, providing a human understandable indication of the account balance may include providing a human understandable indication of the account balance in accordance with a preferred method. If the preference data indicates a preferred order of methods and the data indicative of a preferred order of methods includes data indicating that a first method is a preferred method, the method may include providing a human understandable indication of the account balance using the first method if the first method is available. If the data indicative of the preferred order of methods includes data indicating that a second method is a next preferred method, the method may include providing a human understandable indication of the account balance using the second method if the second method is available and the first method is unavailable.

In some embodiments, the account balance location data 226 and the preferred order of methods data 240, 242, 244 are stored in a record. If the proximity payment device 102 cooperates in accordance with the "PayPass M/chip" standard, the account balance location data 226 and the preferred order of methods data 240, 242, 244 may be stored in both SFI 1 record 1 and SFI 2 record 1. If the proximity payment device 102 operates in accordance with the "PayPass mag stripe" standard, the account balance location data 226 and the preferred order of methods data 240, 242, 244 may be stored in SFI 1 record 1. In some embodiments, the POS system 106 retrieves such record(s) from the proximity payment device 102 during "Read Application Data" processing.

Figure 6A:
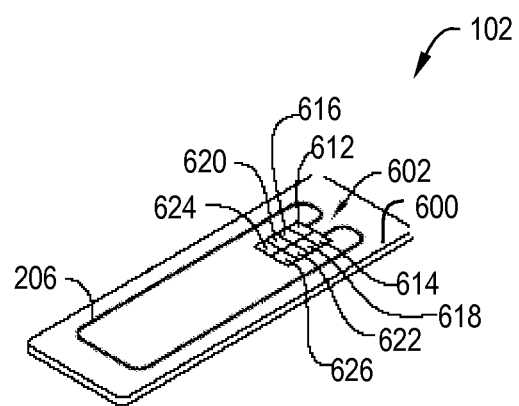
FIG. 6A is a schematic, perspective view of a proximity payment device, according to some embodiments.

FIG. 6A is a perspective, schematic view of the proximity payment device 102, according to some embodiments. Referring to FIG. 6A, in accordance with some embodiments, the proximity payment device 102 may have a body 600 that is plastic and generally rectangular card-shaped or any other configuration (e.g., material(s), size, shape).

The proximity payment device 102 may include an RFID IC 602 that includes the control/storage circuit 204 and the transmit/receive circuitry 208. In some embodiments, the RFID IC 602 may include contacts 612-626. Two of the contacts 612-626, e.g., contacts 612, 614, may be electrically connected to the antenna 206.

The proximity payment device 102 may have information printed and/or otherwise provided thereon. For example, in some embodiments, the payment account number (or a portion thereof), an account holder and/or proximity payment device holder name, a valid from date, an expiration date, a security code and/or other information may be printed and/or otherwise provided on the proximity payment device 102.

If only a portion of the payment account number is provided, such portion may include any number of characters disposed at any position(s) of the account number. In some embodiments, the portion of the payment card account number may include six digits at the beginning of the account number and/or six digits at the end of the account number. If the payment card account number has a BIN portion, the six digits at the beginning of the account number may correspond to such BIN portion. A placeholder may be provided in place of any portion or portions of the payment card account number that are not printed. In some embodiments, one or more X's, (and/or other character(s)) and/or one or more blank spaces may be used as a placeholder for any portions of the payment card account number that are not provided. In some embodiments, an X may be printed in place of each omitted character of the payment card account number.

In some embodiments, the information may include one or more logos and/or brands. In some embodiments, the one or more logos and/or brands may include (i) one or more brands and/or logos of one or more national and/or international payment card organizations such as for example, MasterCard International Incorporated (ii) one or more brands and/or logos of one or more products, such as, for example, PayPass, provided by one or more national and/or international payment card organizations (iii) one or more brands and/or logos of one or more issuers and/or (iv) one or more brands and/or logos of one or more products provided by the one or more issuers. In some embodiments, the information, logos and/or brands may comprise embossed and/or non-embossed numbers and/or letters.

Other features that may be provided on the proximity payment device 102 (though such features are not shown) may include (i) a paper strip or other surface to receive a signature of the account holder and/or proximity payment device holder, (ii) a security code, which may be provided on the paper strip, if present, or/or another suitable location and/or (iii) a magnetic stripe (not shown), which may be read by a magnetic card reader and may store some or all of the information that was (or is to be) stored in proximity payment device 102.

In some embodiments, the proximity payment device 102 is a stand alone device.

In some other embodiments, the proximity payment device 102 is incorporated with another device.

Figure 6B:
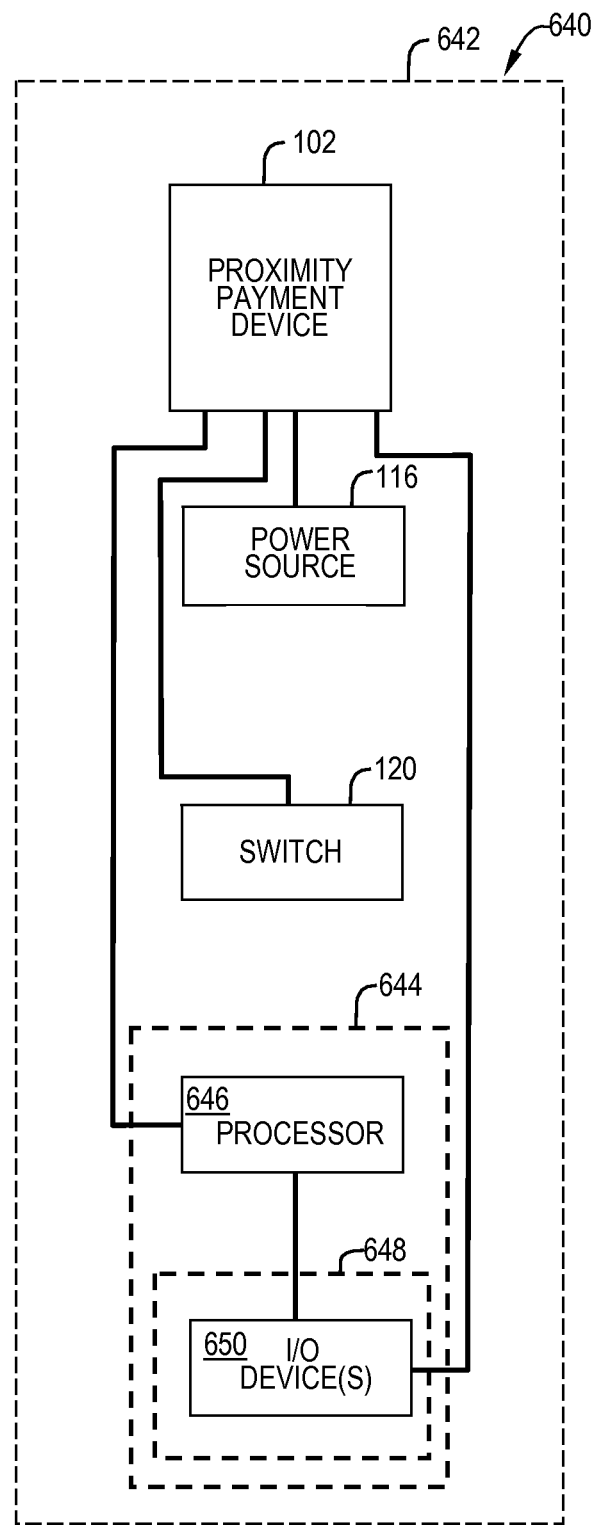
FIG. 6B is a schematic block diagram of a proximity payment device incorporated with another device, according to some embodiments.

FIG. 6B is a schematic block diagram of a proximity payment device 102 incorporated with another device 640, according to some embodiments. In some embodiments, the device 640 may comprise a key fob, a wristwatch, a cell phone, a music player, a video player, a PDA and/or any other type of portable device.

Referring to FIG. 6B, the device 640 may include a body 642. The body 642 may have any suitable configuration.

In some embodiments, the proximity payment device 102 is supported by the body 642. Unless stated otherwise, the term "supported by" means supported by directly and/or indirectly. In some embodiments, supported by includes partially, and/or entirely, disposed on, disposed in, mounted on, mounted in, installed on, installed in, contained in and/or embedded in.

In some embodiments, the switch 120 is supported by the body 642 rather than by the proximity payment device 102.

The device 640 may further include a system 644 to perform one or more functions of the device 640. If the device 640 comprises a wristwatch, the system 644 may comprise circuitry and/or components to perform one or more functions of the wristwatch. If the device 640 comprises a cell phone, the system 644 may comprise circuitry and/or components to perform communication with a cellular network. If the device 640 comprises a music player, the system 644 may comprise circuitry and/or components to play music. If the device 640 comprises a video player, the system 644 may comprise circuitry and/or components to play video (with or without associated audio). If the device 640 comprises a PDA, the system 644 may comprise circuitry and/or components to perform one or more functions of the PDA.

Although the system 644 is shown separate from the proximity payment device 102, the proximity payment device 102 and the system 644 may share one or more circuits and/or components.

The system 644 may include a processor 646 and/or a user interface 648. In some embodiments, the user interface 648 is used to supply information to, and/or receive information from, the proximity payment device holder 104.

The user interface 648 may include one or more input and/or output devices 650. In some embodiments, an input device includes a tactile input device (e.g., a keypad) and/or an acoustic input device (e.g., a microphone). In some embodiments, an output device includes a display device (e.g., a liquid crystal display) and/or an acoustic device (e.g., a speaker).

In some embodiments, one or more of the input and/or output devices 650 are directly and/or indirectly connected to the proximity payment device 102. In some embodiments, information supplied to the proximity payment device holder 104 may be based on information received from the proximity payment device 102. In some embodiments, information received from the proximity payment device holder 104 may be supplied to the proximity payment device 102.

The device 640 may further include a power source 116. The power source 116 may be coupled (directly and/or indirectly) and/or may supply power (directly and/or indirectly) to the proximity payment device 102 and/or the system 644. In some embodiments, the power source 116 comprises a battery.

In some embodiments, one or more portions of one or more methods disclosed herein may be performed by and/or via the user interface 648. In some embodiments, the request to change preference data is supplied and/or received via the user interface 648. In some embodiments, the holder supplies updated preference data to the user interface and the user interface supplies the updated preference data to the proximity payment device. Thus, the user interface 648 may provide the proximity device holder with the ability to change the t preference data directly, i.e., without going through the issuer.

Figure 7:
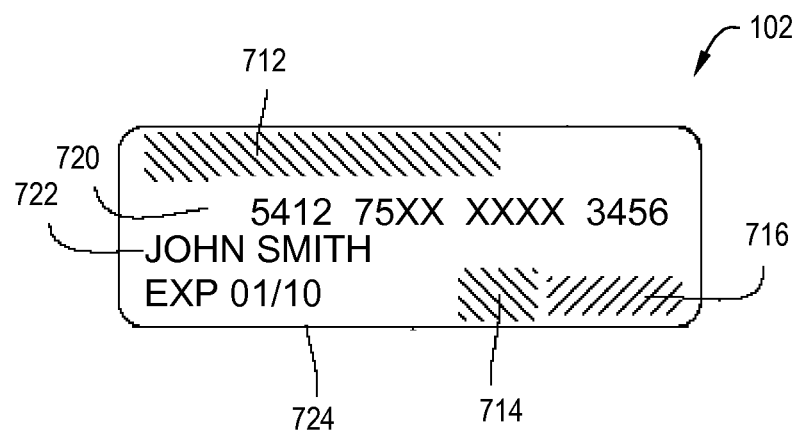
FIG. 7 is a schematic, plan view of a proximity payment device, according to some embodiments.

FIG. 7 is a schematic plan view of a proximity payment device 102, according to some embodiments. Referring to FIG. 7, in accordance with some embodiments, the proximity payment device 102 has a plastic body having regions 712, 714, 716 provided with one or more brand and/or logo of an issuer or a payment card association and/or one or more brand and/or logo of a product provided by the issuer or payment card association. The plastic body is further provided with a portion of a payment account number 720, an account holder and/or proximity payment device holder name 722 and an expiration date 724. The portion of the payment account number 720 includes include six digits that define a first portion of the account number and four digits that define a second portion of the account number. For security, X's are provided in place of six digits of the payment account number. Other configurations may also be employed.

Figure 8:
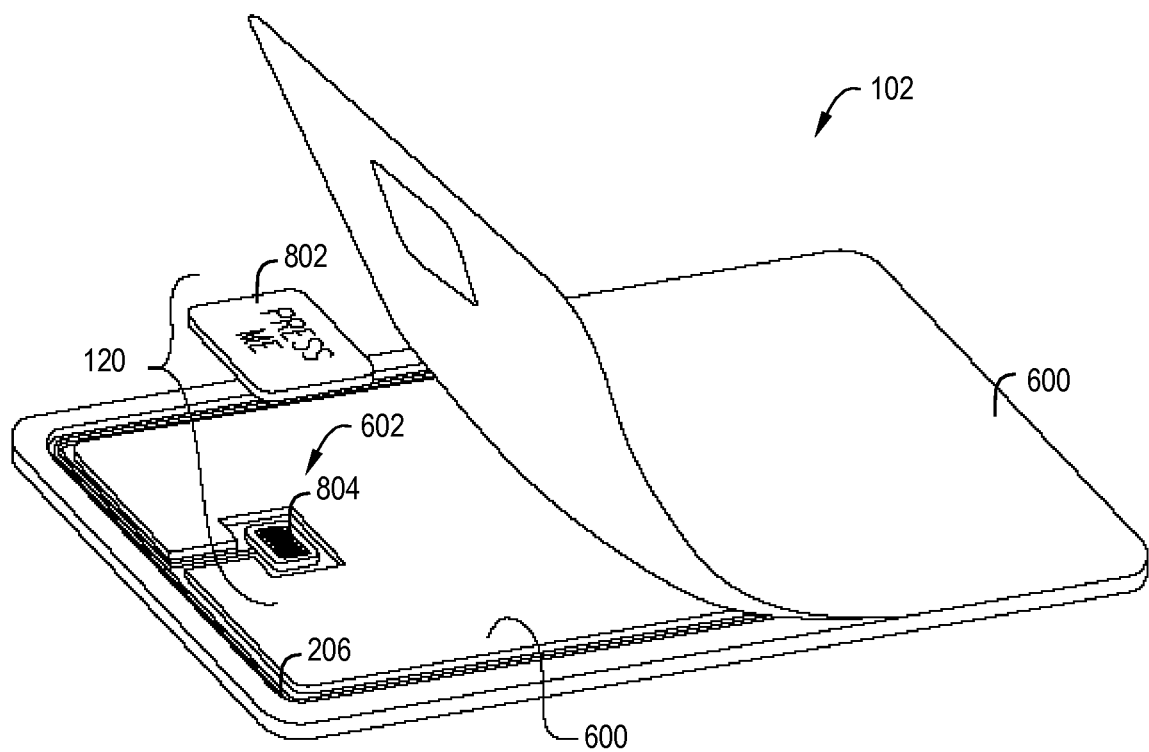
FIG. 8 is a schematic, perspective view of a switch and a proximity payment device, according to some embodiments.

FIG. 8 is a schematic, perspective view of the proximity payment device 102, in a partially assembled state, according to some embodiments.

Referring to FIG. 8, as stated above, in some embodiments, the proximity payment device 102 supports a switch 120 that may be used in providing consent to provide a human understandable indication of an account balance of a payment account.

In some embodiments, the switch 120 includes a first portion 802 and a second portion 804. In some embodiments, the second portion 804 is disposed on the RFID IC 602. In some embodiments, the switch 100 may be actuated by pressing on the first portion 802 and/or by pressing on the second portion 804.

In some embodiments, one or more portions of the switch 120 may the same as and/or similar to one or more portions of one or more embodiments of the proximity payment card disclosed in U.S. patent application Ser. No. 11/503,197, published as U.S Patent Application Publication No. 2008/0035740, entitled "PROXIMITY PAYMENT CARD WITH USER-ACTUATED SWITCH AND METHODS OF MAKING THE CARD", filed in the name of Colin Tanner on Aug. 11, 2006, the contents of which are hereby incorporated by reference.

Figure 9:
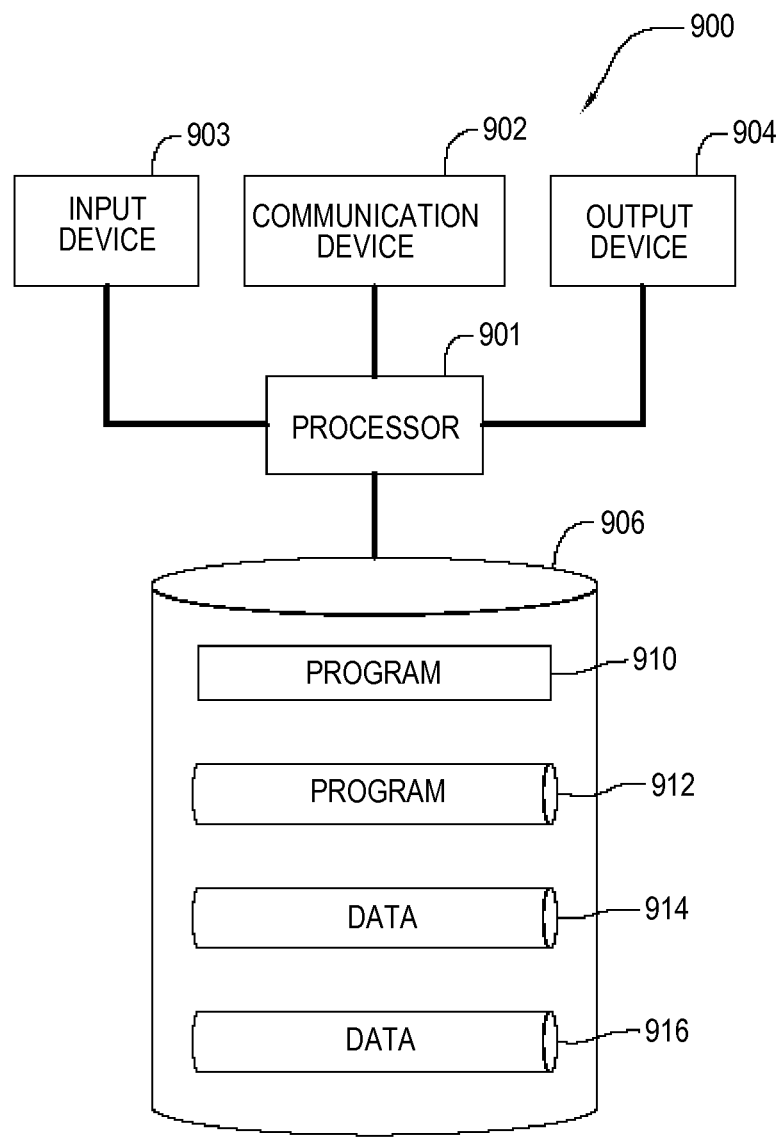
FIG. 9 is a block diagram of an architecture, according to some embodiments.

FIG. 9 is a block diagram of an architecture 900 according to some embodiments. In some embodiments, one or more of the systems, devices and/or circuitry (or portion(s) thereof) disclosed herein may have an architecture that is the same as and/or similar to one or more portions of the architecture 900.

Referring to FIG. 9, in accordance with some embodiments, the architecture 900 includes a processor 901 operatively coupled to a communication device 902, an input device 903, an output device 904 and a storage device 906.

In some embodiments, the processor 901 may execute processor-executable program code to provide one or more portions of the one or more functions disclosed herein and/or to carry out one or more portions of one or more embodiments of one or more methods disclosed herein. In some embodiments, the processor 901 may be a conventional microprocessor or microprocessors.

The communication device 902 may be used to facilitate communication with other devices and/or systems. In some embodiments, communication device 902 may be configured with hardware suitable to physically interface with one or more external devices and/or network connections. For example, communication device 902 may comprise an Ethernet connection to a local area network through which architecture 900 may receive and transmit information over the Internet and/or one or more other network(s).

The input device 903 may comprise, for example, one or more devices used to input data and/or other information, such as, for example: a keyboard, a keypad, track ball, touchpad, a mouse or other pointing device, a microphone, knob or a switch, an infra-red (IR) port, etc. The output device 904 may comprise, for example, one or more devices used to output data and/or other information, such as, for example: an IR port, a display, a speaker, and/or a printer, etc.

The storage device 906 may comprise, for example, one or more storage devices, such as, for example, magnetic storage devices (e.g., magnetic tape and hard disk drives), optical storage devices, and/or semiconductor memory devices such as Random Access Memory (RAM) devices and Read Only Memory (ROM) devices.

The storage device 906 may store one or more programs 910-912, which may include one or more instructions to be executed by the processor 901.

In some embodiments, the one or more programs may include one or more operating systems, database management systems, other applications, other information files, etc., for operation of the architecture 900.

The storage device 906 may store one or more databases 914-916 and/or criteria for one or more programs. As used herein a "database" may refer to one or more related or unrelated databases. Data and/or other information may be stored in any form. In some embodiments, data and/or other information may be stored in raw, excerpted, summarized and/or analyzed form.

In some embodiments, one or more portions of one or more embodiments disclosed herein may be embodied in a method, an apparatus, a computer program product, and/or an article where the article includes a machine readable storage medium with instructions stored thereon. As used herein, a machine may be any type of machine. In some embodiments, a machine comprises a computer. In some embodiments, a machine comprises a proximity coupling system.

As used herein, a signal may be any type of signal, i.e., a physical quantity (e.g., voltage, current, or magnetic field), an indication, a message and/or any other type of signal or combination thereof.

A wireless communication interface may be any type of wireless communication interface.

A circuit may be programmable or non programmable, general purpose or special purpose, dedicated or non dedicated, distributed or non distributed, shared or not shared, and/or any combination thereof. If the circuit has two or more distributed portions, the two or more portions may communicate with one another through a communication link. A circuit may include, for example, but is not limited to, hardware, software, firmware, hardwired circuits and/or any combination thereof.

As used herein, a proximity payment device refers to any device, of any shape, that transmits an account number to a point of sale system via wireless transmission. As used herein, an account number may be numeric, non numeric and/or a combination thereof.

In some embodiments, a proximity payment device may also have a contact interface like that of a conventional smart card that includes a contact interface.

Unless otherwise stated, terms such as, for example, "in response to" and "based on" mean "in response at least to" and "based at least on", respectively, so as not to preclude being responsive to and/or based on, more than one thing.

In addition, unless stated otherwise, terms such as, for example, "comprises", "has", "includes", and all forms thereof, are considered open-ended, so as not to preclude additional elements and/or features. In addition, unless stated otherwise, terms such as, for example, "a", "one", "first", are considered open-ended, and do not mean "only a", "only one" and "only a first", respectively. Moreover, unless stated otherwise, the term "first" does not, by itself, require that there also be a "second".

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method comprising:
   receiving, in association with a payment transaction, information at a proximity coupling system via a proximity payment card that is associated with a payment account and has a generally rectangular shape consistent with ISO/IEC 14443;
   receiving, in the proximity coupling system via the proximity payment card having the generally rectangular shape consistent with ISO/IEC 14443, holder consent to provide a human understandable indication of an account balance associated with the payment account; and
   providing a human understandable indication of the account balance via an output device, in response at least in part to the consent.

2. The method of claim 1, further comprising:
   initiating the payment transaction in response at least in part to receiving the information via the proximity payment card having the generally rectangular shape consistent with ISO/IEC 14443.

3. The method of claim 1, where the proximity coupling system comprises a point of sale system.

4. The method of claim 1 wherein the account balance comprises a monetary balance.

5. The method of claim 1, wherein receiving holder consent comprises determining whether the proximity payment card having the generally rectangular shape consistent with ISO/IEC 14443 has been positioned within range of the proximity coupling system for at least a predetermined amount of time after a reference and wherein the reference comprises an indication to the holder after the account data is received.

6. The method of claim 1, wherein receiving holder consent comprises receiving holder consent based at least in part on whether a holder has actuated a switch supported by the proximity payment card having the generally rectangular shape consistent with ISO/IEC 14443.

7. The method of claim 1, wherein providing a human understandable indication of the account balance comprises printing the account balance.

8. The method of claim 1, wherein providing a human understandable indication of the account balance comprises displaying the account balance on an electronic display device.

9. The method of claim 1, wherein providing a human understandable indication of the account balance comprises displaying the account balance to an operator of the proximity coupling system who thereafter verbally informs the holder of the account balance.

10. The method of claim 1, wherein providing a human understandable indication of the account balance comprises indicating the account balance using machine generated speech.

11. The method of claim 1, further comprising receiving, in the proximity coupling system, preference data from the proximity payment card having the generally rectangular shape consistent with ISO/IEC 14443, the preference data indicative of a preferred method to provide a human understandable indication of the account balance.

12. The method of claim 11, wherein providing a human understandable indication of the account balance comprises providing a human understandable indication of the account balance in accordance with the preferred method.

13. The method of claim 1, further comprising receiving, in the proximity coupling system, preference data from the proximity payment card having the generally rectangular shape consistent with ISO/IEC 14443, the preference data indicative of a preferred order of methods to provide a human understandable indication of the account balance.

14. The method of claim 13, wherein the data indicative of a preferred order of methods includes data indicating that a first method is a preferred method and wherein providing a human understandable indication of the account balance comprises providing a human understandable indication of the account balance using the first method if the first method is available.

15. The method of claim 13, wherein the data indicative of a preferred order of methods includes data indicating that a second method is a preferred method if the first method is unavailable and wherein providing a human understandable indication of the account balance comprises providing a human understandable indication of the account balance using the second method if the second method is available and the first method is unavailable.

16. Apparatus comprising;
a proximity coupling system to: (i) receive, in association with a payment transaction, information via a proximity payment card that is associated with a payment account and has a generally rectangular shape consistent with ISO/IEC 14443 and, (ii) receive via the proximity payment card having the generally rectangular shape consistent with ISO/IEC 14443, holder consent to provide a human understandable indication of an account balance associated with the payment account; and
an output device to provide a human understandable indication of the account balance.

17. The apparatus of claim 16, wherein the information comprises account data; and
wherein the proximity coupling system comprises a processor to receive the account data from the proximity payment card having the generally rectangular shape consistent with ISO/IEC 14443 and to initiate the payment transaction in response at least in part to receiving the account data.

18. The apparatus of claim 16, wherein the account balance comprises a monetary account balance.

19. The apparatus of claim 16 wherein the proximity payment card having the generally rectangular shape consistent with ISO/IEC 14443 comprises a radio frequency identification circuit.

20. The apparatus of claim 16 wherein the proximity coupling system comprises a processor to receive holder consent by determining whether the proximity payment card having the generally rectangular shape consistent with ISO/IEC 14443 has been positioned within range of the proximity coupling system for at least a predetermined amount of time after a reference and wherein the reference comprises an indication to the holder after the account data is received.

21. The apparatus of claim 16, wherein the holder consent comprises holder consent based at least in part on whether a holder has actuated a switch.

22. The apparatus of claim 16, wherein the proximity coupling system comprises a processor to receive preference data from the proximity payment card having the generally rectangular shape consistent with ISO/IEC 14443, the preference data indicative of a preferred method to provide a human understandable indication of the account balance.

23. The apparatus of claim 16, wherein the proximity coupling system comprises a processor to receive preference data from the proximity payment card having the generally rectangular shape consistent with ISO/IEC 14443, the preference data indicative of a preferred order of methods to provide a human understandable indication of the account balance.

24. A non-transitory machine readable storage medium having instructions stored thereon, the instructions executable by a processor to result in a method comprising:
receiving, in association with a payment transaction, information at a proximity coupling system via a proximity payment card that is associated with a payment account and has a generally rectangular shape consistent with ISO/IEC 14443;
receiving, in the proximity coupling system via the proximity payment card having the generally rectangular shape consistent with ISO/IEC 14443, holder consent to provide a human understandable indication of an account balance associated with the payment account; and
providing a human understandable indication of the account balance via an output device, in response at least in part to the consent.

25. Apparatus comprising:
a proximity payment card that has a generally rectangular shape consistent with ISO/IEC 14443 and is to: (i) transmit, in association with a payment transaction, account data associated with a payment account and (ii) provide holder consent to provide a human understandable indication of an account balance associated with the payment account.

26. The apparatus of claim 25, wherein the proximity payment card having the generally rectangular shape consistent with ISO/IEC 14443 comprises:
data indicative of whether there is consent to provide a human understandable indication of an account balance; and
a switch;
wherein the proximity payment card having the generally rectangular shape consistent with ISO/IEC 14443 generates the data indicative of whether there is consent to provide a human understandable indication of an account balance based at least in part on whether a holder has actuated the switch.

27. The apparatus of claim 25, wherein the proximity payment card having the generally rectangular shape consistent with ISO/IEC 14443 comprises:
a wireless communication interface to: (i) transmit, in association with the payment transaction, the account data associated with the payment account and (ii) provide the holder consent to provide the human understandable indication of the account balance associated with the payment account.

28. A non-transitory machine readable storage medium having instructions stored thereon, the instructions executable by a processor to result in a method comprising:
transmitting, in association with a payment transaction, information from a proximity payment card that is associated with a payment account and has a generally rectangular shape consistent with ISO/IEC 14443; and
providing, by the proximity payment card having the generally rectangular shape consistent with ISO/IEC 14443, holder consent to provide a human understandable indication of an account balance associated with the payment account.

29. A method comprising:
  transmitting, in association with a payment transaction, information from a proximity payment card that is associated with a payment account and has a generally rectangular shape consistent with ISO/IEC 14443; and
  providing, by the proximity payment card having the generally rectangular shape consistent with ISO/IEC 14443, holder consent to provide a human understandable indication of an account balance associated with the payment account.

30. The method of claim 29, wherein the account balance comprises a monetary balance.

31. The method of claim 29, further comprising:
  storing preference data in the proximity payment card having the generally rectangular shape consistent with ISO/IEC 14443, wherein the preference data is indicative of a preferred method to provide the human understandable indication of the account balance.

32. The method of claim 29 wherein the proximity payment card having the generally rectangular shape consistent with ISO/IEC 14443 comprises a radio frequency identification circuit.

33. A non-transitory machine readable storage medium having instructions stored thereon, the instructions executable by a proximity coupling system to result in a method comprising:
  receiving, in association with a payment transaction, information at a proximity coupling system via a proximity payment card that is associated with a payment account and has a generally rectangular shape consistent with ISO/IEC 14443;
  receiving, in the proximity coupling system via the proximity payment card having the generally rectangular shape consistent with ISO/IEC 14443, holder consent to provide a human understandable indication of an account balance associated with the payment account; and
  providing a human understandable indication of the account balance via an output device, in response at least in part to the consent.

34. A method comprising:
  receiving, in association with a payment transaction, information at a proximity coupling system via a proximity payment card that is associated with a payment account and has a generally rectangular shape with a thickness of 0.030 inches;
  receiving, in the proximity coupling system via the proximity payment card having the generally rectangular shape with a thickness of 0.030 inches, holder consent to provide a human understandable indication of an account balance associated with the payment account; and
  providing a human understandable indication of the account balance via an output device, in response at least in part to the consent.

* * * * *